//

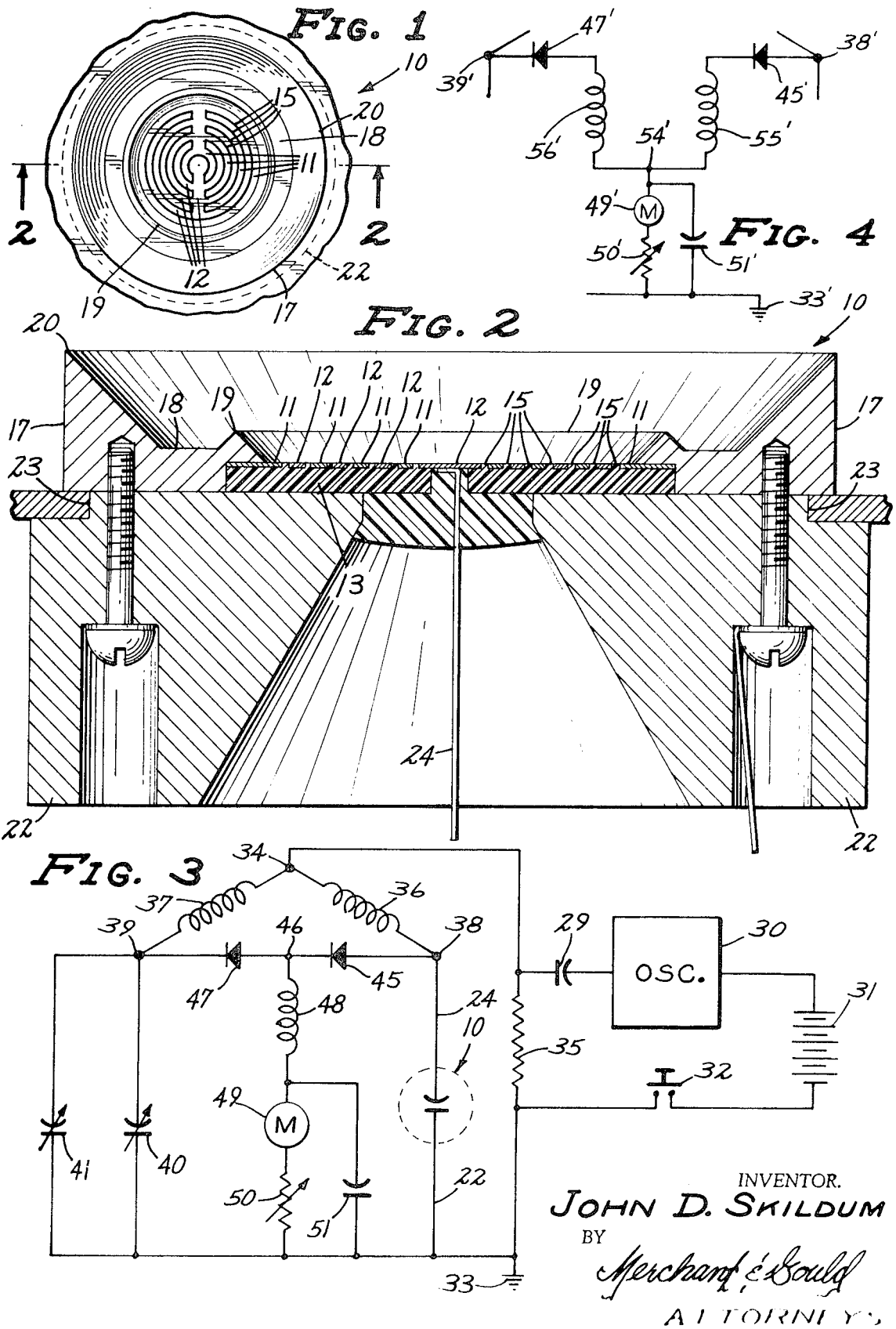

TEST INSTRUMENT AND METHOD FOR ISOLATING AND MEASURING THE CAPACITANCE DUE TO A PARTICULAR FUNCTIONAL GROUP IN A LIQUID

BACKGROUND OF THE INVENTION

1. Field of thd Invention

The present invention pertains to an instrument and a method of quickly testing, in the field, various properties of liquids, such as oils and the like, which properties are not normally obtainable, except in complicated laboratory tests. It has been found, for example, that many desirable characteristics of oils and the like disappear as oxidation of the oils and the like increases. Lubricating oils, for example, lose much of their lubricating properties as oxidation increases. Cooking oils become rancid as oxidation takes place therein. It is believed that many other characteristics of various liquids may be tested in a similar fashion with the present equipment but the information required to elaborate on the various liquids and characteristics thereof is presently not available.

2. Description of the Prior Art

In the prior art it is common to provide apparatus for measuring the conductivity of liquids, such as oils and the like, to determine the amount of impurities therein. If the impurities in the liquid have a different conductivity than that of the liquid, the conductivity of the combination of impurity and liquid will be altered. However, many characteristics, such as the oxidation of oil, does not substantially alter the conductivity of the liquid and, thus, cannot be detected by these prior art instruments.

SUMMARY OF THE INVENTION

The present invention pertains to a liquid test instrument and method wherein a sensor having a planar surface formed by two uniformly spaced apart electrodes and a low capacitance, insulative material in the gap therebetween, is utilized in a sensitive capacitance measuring circuit to compare the capacitance of the sensor with a predetermined amount of the liquid to be tested thereon to the capacitance of the sensor with a predetermined amount of a standard liquid thereon. As an example, as oxidation of oil increases the dielectric constant of the oil increases and the capacitance of the oil increases.

It is an object of the present invention to provide an improved liquid test instrument.

It is a further object of the present invention to provide an improved liquid test instrument which can relatively accurately measure chemical or structural changes in various liquids, such as oxidation in oils.

It is a further object of the present invention to provide an improved sensor constructed to receive a small amount of liquid therein and having a minimal amount of capacitance with no liquid therein.

It is a further object of the present invention to provide an improved method for testing liquids and the like to determine chemical and/or structural changes in liquids.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in top plan of an improved sensor;

FIG. 2 is an enlarged sectional view as seen from the line 2—2 in FIG. 1;

FIG. 3 is a schematic diagram of the present liquid test instrument; and

FIG. 4 is a schematic diagram of another embodiment of the detector section for the liquid test instrument.

DESCRIPTION OF THE PREFERRED EMBODIMENTS

The capacitance of many liquids, such as lubricating oils, increase with the oxidation of the liquids. The measurement of this capacitance change due to oxidation is very difficult in bulk quantities of liquid because of foreign materials therein, such as additives in lubricating oils, and also the type of crude oil, the catalytic cracking, acid formations, etc., all of which either increase or decrease the liquid capacitance. Also, the measurement is difficult since the capacitance change due to oxidation is very small in comparison to the capacitance change due to the additives, catalytic cracking, etc. The purpose of this invention is to examine the capacitance change due solely to oxidation by isolating the oxidation capacitance from the capacitance due to additives, catalytic cracking, etc.

Through the use of a sensor having a pair of planar electrodes with a uniform gap therebetween, a liquid-solid interface with electrical field lines through the liquid is obtained. Because the measuring surface of the sensor is planar, the most intense field lines are adjacent the surface and the intensity of the lines decreases rapidly as the distance from the surface increases, and in fact, a molecule located at a distance greater than the gap between the electrodes will not be affected by the field. Thus, substantially all of the effects produced by the field lines occur in the thin skin of liquid adjacent the planar surface of the sensor. This invention measures the capacitance of the thin skin of liquid. As now described, this thin skin capacitance is the capacitance due to oxidation.

It is believed that the intense electrical field lines adjacent the surface of the sensor cause molecules of the liquid, which are relatively long carbon chains, to become oriented generally perpendicular to the planar surface of the sensor if these molecules include functional groups which would for instance include oxides, keytones or alcohols. These functional groups tend to produce an electrically non-symmetrical internal charge (negative at one end and positive at the other) in the molecules, which are normally electrically neutral and symmetrical.

While these functional groups are oriented perpendicularly to the planar surface of the sensor, it is believed that the foreign materials, such as additives which are typically smaller molecules and usually ionic, are repelled upwardly from the surface of the sensor by a positive ion space charge developed at the surface. Not only are foreign materials repelled upwardly but larger molecules with very electro-negative functional groups, such as acid groups having much greater internal charge separation, are repelled upwardly out of the influence of the field lines by the space charge with proper sizing of the sensor and proper selection of the amplitude and frequency of the electric field. Less electrically active molecules are not affected by the space charge and will remain near the surface in the thin skin. The less active molecules will be those which have oxygen functional groups, or no functional groups, which latter groups will not however contribute to capacitance.

Thus, the skin effect capacitance is measured. Capacitance is generally defined in terms of orientation polarization of molecules which basically is dependent upon the rotation of the molecule in a given field where the rotation is induced by the oscillating field. The skin effect capacitance would be a measurement in a skin of liquid from which, due to the physical and electrical properties of the sensor, molecules of fast rotation have been excluded along with additives, and due to the frequency and amplitude of an oscillating field molecules of slow oscillation are excluded, thus isolating for measurement the capacitance of those molecules which have oxygen groups.

Throughout the description of the preferred embodiment the liquids being tested will be lubricating-type oils and the various values of components, frequencies and meter readings will be specified accordingly. It should be understood, however, that modifications and alterations can be made to the embodiment by those skilled in the art so that other measurements and liquid characteristics can be determined. Through the use of the sensor illustrated in FIGS. 1 and 2 and the circuitry illustrated in FIG. 3, changes in capacitance, and particularly skin effect capacitance, and, consequently, changes in oxidation of oils can be detected and translated into meaningful data. While a particular embodiment of a sensor is illustrated it should be understood that any embodiment incorporating the principles described herein might be utilized. Further, specific electronic circuitry is described but it should be understood that substantially any sensitive (in the 20 pirofarad range) capacitance measuring circuitry can be utilized.

Referring to FIGS. 1 and 2, a sensor generally designated 10 is illustrated. The sensor includes a pair of very thin electrodes 11 and 12, which in this embodiment are formed on a disc-shaped piece of substrate 13. The electrodes 11 and 12 are formed in any of the well-known convenient techniques, examples of which are chemical etching, plating, silk-screening, etc., and the material from which they are formed is any relatively inert metal conductor such as gold, platinum, nickel, stainless steel, or the like. As can be seen in FIG. 1, the electrodes 11 and 12 are formed in a plurality of concentric ring portions interconnected to form a continuous, uniform gap 15 between the electrodes 11 and 12. In general, measurements are more accurate and easier to make if the gap length is as long as practical, which gap length generally lies in the range of approximately 3 to 12 inches. The illustrated concentric ring type of configuration easily provides a gap length in the range of 5 to 10 inches within a diameter of approximately one-half inch. It should be understood, however, that other configurations might be devised by those skilled in the art and the present one is simply illustrated for exemplary purposes.

The substrate 13, upon which the electrodes 11 and 12 are formed, is any convenient non-conductive material, such as various epoxy reins or the like. The electrodes 11 and 12 are formed so that the outwardly directed surfaces thereof lie in a common plane and the gap 15 is filled with a suitable non-conductive material such as glass, various plastics, epoxy resins, or the like. In the present embodiment the electrodes 11 and 12 were etched and platted on a semi-cured epoxy resin board, which board forms the substrate 13, and the electrodes 11 and 12 were then pressed into the substrate 13 so the outwardly directed surfaces thereof are flush with the outwardly directed surface of the substrate 13 to form a planar surface therewith. The thickness of the electrodes 11 and 12 should be ideally less than 0.010 inches and in the disclosed embodiment the thickness thereof is approximately 0.005 inches. The width of the gap 15 should be less than 0.015 inches with the width of the gap 15 in the present embodiment being 0.005 inches. The width of the electrodes 11 and 12 should be at least twice the width of the gap 15 and the width of the electrodes 11 and 12 in the present embodiment is 0.020 inches. It is believed that the above-described sizes and relationships are necessary for proper shape of low-intensity field lines and to confine intense electrical field lines to the liquid/solid interface when the planar surface of the sensor 10 has liquids placed thereon. Further, the foregoing sizes and relationships provide a sensor 10 with very small capacitance, relative to the capacitance of the sensor 10 with a liquid placed thereon.

A cylindrical wall 17 is positioned concentrically around the substrate 13 to form a liquid reservoir with the electrodes 11 and 12 and the upwardly directed surface of the substrate 13 forming the bottom wall thereof. The cylindrical side wall 17 is formed with a dip 18 approximately midway between two longitudinally extending ring-shaped peaks 19 and 20. Peak 19 is somewhat lower than peak 20 and has a smaller diameter than peak 20. The ring-shaped peak 19 should have a height approximately 5 to 10 times the width of the gap 15 so that the electronic measurements are independent of the liquid depth. The liquid will be placed on the electrodes 11 and 12 within the ring-shaped peak 19 to a depth such that the liquid just begins to flow into the dip 18. Thus, while many configurations of the cylindrical wall 17 may be devised, the present configuration provides an indication as to the proper depth of the liquids to be tested while confining the liquid to the test area.

A heat sink 22 is affixed to the sensor 10 in engagement with the wall 17 and substrate 13, opposite the electrodes 11 and 12, and cooperates with the wall 17 to form a groove 23 in the periphery of the sensor 10 for mounting purposes. In the present embodiment the wall 17 and heat sink 22 are formed of conductive metal and are connected together and to the electrode 11 to provide an electrical return path. The heat sink 22 has a central opening therethrough and a contact 24, which is connected through the substrate 13 to the electrode 12, extends outwardly therethrough. In many instances the temperatures of liquids being tested will vary widely, depending upon whether the oil comes from a hot or cold engine, etc., and the heat sink 22 serves to quickly bring the temperature of the liquid to within approximately 40°F of the temperature of the electronic components to be described presently. Since the overall diameter of the electrodes 11 and 12 is in the neighborhood of one-half inch and the height of the peak 19 is approximately 0.045 inches, in this embodiment, the liquid required in the sensor 10 is less than three drops and the heat sink 22 can quickly alter the heat thereof to within the desired range.

Referring to FIG. 3, a high frequency signal producing means 30, which may be any apparatus, such as electronic oscillators or the like, has connected thereto one side of a power source 31, which in this embodiment is a simple battery. The opposite side of the power source 31 is connected through a pushbutton switch 32 to a common or ground connection 33. In general, the type of oscillatory signal produced by the signal producing means 30 is not critical but the frequency must be in the range of 1 to 75 megahertz with no greater than approximately plus or minus 10 percent deviation over the useful temperature of the instrument. Further, the amplitude of the output signal is determined by the construction of the sensor 10 and should not exceed the break-down voltage of the gap or the liquid being tested but, experiments indicate, that the output amplitude should produce an electric field which is greater than 50 volts per centimeter. In the present embodiment a five megahertz crystal oscillator is used with an amplitude of the output signal of approximately 4.8 volts.

The output of the signal producing means 30 is coupled through a DC blocking capacitor 29 to a junction 34. Junction 34 is connected through a load resistor 35 to the ground connection 33. Junction 34 also has a pair of inductors 36 and 37 connected thereto with the opposite ends connected to junctions 38 and 39, respectively. Inductors 36 and 37 form two adjacent legs of an electronic bridge circuit the input of which is between junction 34 and ground 33 and the output of which is between junctions 38 and 39. Contact 24 of sensor 10 is connected to junction 38 and heat sink 22 of sensor 10 is connected to ground 33. Thus, sensor 10 forms a third leg of the bridge circuit. The fourth leg of the bridge circuit is formed by two variable capacitors 40 and 41 connected in parallel between junction 39 and ground 33.

A detector and indicator circuit is connected between junctions 38 and 39 of the bridge circuit to receive output signals therefrom. The detector and indicator circuit includes a diode 45, having the anode connected to the junction 38 and the cathode connected to a junction 46, and a diode 47, having the anode connected to the junction 46 and the cathode connected to the junction 39. One end of an inductor 48 is connected to a null meter 49 to one end of a potentiometer 50. The other end of the potentiometer 50 is connected to the ground 33. A bypass capacitor 51 is connected in parallel with the null meter 49 and the potentiometer 50 to bypass any AC components that may pass through the detector circuit. It should be understood that the null meter 49 is illustrated for exemplary purposes and many other types of indicators might be utilized by those skilled in the art. Typical values of the various components are listed below for the particular sensor 10 and signal producing means 30 specified above.

| Capacitors | 33 | 0.01 microfarads |
| --- | --- | --- |
| | 40 | max. 20 picofarads |
| | 41 | 0.5–2.5 picofarads |
| | 51 | 0.01 microfarads |
| Resistors | 35 | 1 K Ohm |
| | 50 | 0–1 K Ohm |
| Inductors | 36 | 73 microhenrys |
| | 37 | 30 microhenrys |
| | 48 | 2.5 millihenrys |
| Diodes | 45 | 1N914 |
| | 49 | 1N914 |

The particular detector illustrated and described in conjunction with FIG. 3 is phase-sensitive, which gives it maximum sensitivity. However, in the event that a detector with greater stability is desired, a detector which is not phase-sensitive, such as the detector illustrated in FIG. 4, may be utilized. In the detector illustrated in FIG. 4 parts similar to those in the embodiment of FIG. 3 are designated with similar numbers and all numbers have a prime added to indicate a different embodiment. In the embodiment of the detector illustrated in FIG. 4, the anode of a diode 45' is connected to a junction 38' and the cathode of a diode 47' is connected to a junction 39'. An inductance or choke 55' is connected from the cathode of the diode 45' to a junction 54' and a second inductance or choke 56' is connected from the anode of the diode 47' to the junction 54'. A meter 49' and potentiometer 50' are connected in series between the junction 54' and the ground 33' and a bypass capacitor 51' is connected in parallel with the meter 49' and potentiometer 50'. It should be understood that the remainder of the circuitry is similar to that illustrated in FIG. 3 and will not be described or illustrated further. Many other embodiments of detector and indicating circuits may be devised by those skilled in the art and those illustrated in FIGS. 3 and 4 are simply for exemplary purposes.

In a typical manufacturers calibration-type procedure, the variable capacitor 41, which is calibrated in terms of percentage of oxidation, is set to a minimum. The reservoir formed by wall 17 and sensor 10 is filled with a good or non-oxidized oil to the prescribed level. The variable capacitor 40 is adjusted until the meter 49 is at a null, whereupon, the bridge is balanced. The good oil is removed from the reservoir and oil of a known degradation is placed therein. Variable capacitor 41 is then adjusted until the meter 49 indicates zero, or a balanced bridge. A scale associated with the variable capacitor 41 is adjusted to indicate the quality of oil in the reservoir (that is the amount of oxidation in the oil of known degradation). Capacitor 40 is only a factory adjustment and is positioned inside of a housing or the like mounting all of the various components so that the operator cannot normally adjust this capacitor.

In a typical oil testing procedure, variable capacitor 41 is set to indicate zero oxidation, that is the capacitor 41 is set to a minimum capacitance. The oil to be tested is placed in the reservoir of the sensor 10 and the variable capacitor 41 is adjusted, if necessary, until the meter 49 is at a null, whereupon the bridge is balanced. The calibrated scale associated with the variable capacitor 41 indicates directly the oxidation number or percentage of oxidation of the oil in the sensor 10. In the event that excess contamination, such as water or metal particles, is present in the oil being tested, the meter 49 will move off scale, even when capacitor 41 is at a maximum, which is an indication to the operator of the excess contamination present. Thus, a liquid test instrument is disclosed which will readily indicate characteristics of liquids, such as oils and the like, which are not normally available in other than laboratory tests. Further, because of the novel construction of the sensor 10 the amount of capacitance present in the sensor 10 without liquid thereon is substantially smaller than the amount of capacitance of the sensor 10 with liquid thereon. Thus, deviations in the skin effect capacitance of the liquids due to oxidation or the like produce a substantial effect in the instrument and, therefore, are easily discernible.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A liquid test instrument for isolating and measuring the capacitance due to oxygen functional groups in a liquid comprising:
   a. a sensor including a liquid retaining reservoir with a pair of spaced apart electrodes oriented so liquid contacting surfaces thereof lie in a common plane within said liquid reservoir;
   b. means connected to said electrodes for applying a relatively high frequency alternating signal between said electrodes;
   c. electronic means connected to said electrodes for measuring the capacitance therebetween; and
   d. indicator means connected to said electronic means for indicating any change of capacitance between said electrodes when said reservoir is filled with a liquid to be tested compared with the capacitance when the reservoir is filled with a standard liquid,
   e. whereby, the indication of a change in capacitance provides a measurement of the capacitance due to oxygen functional groups in said liquid.

2. A liquid test instrument comprising:
   a. a sensor including a dish-like liquid reservoir having a liquid capacitance of several drops and a pair of spaced apart electrodes oriented so liquid contacting surfaces thereof lie in a common plane within said reservoir wherein the electrodes form a substantial portion of the bottom thereof;
   b. means connected to said electrodes for applying a relatively high frequency alternating signal between said electrodes;
   c. electronic means connected to said electrodes for measuring the capacitance therebetween; and
   d. indicator means connected to said electronic means for indicating any change of capacitance between said electrodes when said reservoir is filled with a liquid to be tested compared with the capacitance when the reservoir is filled with a standard liquid.

3. A liquid test instrument as set forth in claim 16 wherein the electrodes are spaced apart a distance in the range of approximately 0.001 inches to 0.015 inches.

4. A liquid test instrument as set forth in claim 3 wherein the electrodes are formed on a substrate and have a thickness in the range of approximately 0.001 inches to 0.02 inches.

5. A liquid test instrument as set forth in claim 4 wherein the electrodes have a width not less than approximately twice the distance between the electrodes and the length of the gap formed between the adjacent electrodes is in the range of approximately 3 inches to 12 inches.

6. A liquid test instrument as set forth in claim 16 wherein the electronic means includes a bridge-type circuit with the electrodes of the sensor connected in one leg thereof.

7. A liquid test instrument as set forth in claim 16 wherein the means connected to apply a frequency to the electrodes includes an electronic oscillator operating at a frequency in the range of approximately 1 to 75 megahertz.

8. A liquid test instrument for isolating and measuring the capacitance due to oxygen functional groups in a liquid comprising:
   a. a bridge circuit having inductive components in two adjacent legs thereof and variable capacitance means in one of the remaining legs;
   b. a pair of spaced apart electrodes, oriented within a liquid-holding reservoir so liquid contacting surfaces thereof lie in a common plane, connected in the remaining leg of said bridge circuit;
   c. a high frequency oscillator connected across the input of said bridge circuit; and
   d. a detector circuit and null meter connected across the output of the bridge circuit for indicating any change in capacitance between said electrodes when said reservoir is filled with a liquid to be tested compartd with the capacitance when the reservoir is filled with a standard liquid,
   e. whereby, the indication of a change in capacitance provides a measurement of the capacitance due to oxygen functional goups in a liquid.

9. A liquid test instrument as set forth in claim 8 having in addition means surrounding the liquid contacting surfaces of the electrodes for forming a liquid receiving reservoir with a predetermined capacity.

10. A liquid test instrument as set forth in claim 8 wherein the inductance in series with the variable capacitance is small compared to the remaining inductance and the variable capacitance is large compared to the spaced apart electrodes.

11. A sensor for isolating and measuring the capacitance due to oxygen functional groups in liquid comprising:
    a. a substrate formed of an electrical insulating material;
    b. first and second electrodes of thickness less than 0.02 inches formed on said substrate to provide a uniform elongated gap therebetween of less than 0.015 inches with outwardly directed surfaces thereof lying in a common plane;
    c. an electrical insulating material filling said gap to form a planar surface with the outwardly directed surfaces, said gap filling material being a relatively low capacitive material; and
    d. means encompassing the outwardly directed surfaces of said electrodes and the gap therebetween and cooperating with the planar surface to form a liquid retaining reservoir; and
    e. means connected to said electrodes for comparing the capacitance between said electrodes when said reservoir is filled with a liquid to be tested with the capacitance between said electrodes when said reservoir is filled with a standard liquid.

12. A method of testing the degree of oxidation of various liquids, such as oils and the like, comprising the steps of:
    a. providing a sensor having a planar surface formed by two uniformly spaced apart electrodes and a low capacitive, insulative material in the gap therebetween;

b. placing a small quantity of the liquid to be tested on the planar surface so as to cover the electrodes to a predetermined depth; and c. comparing the capacitance of the sensor and liquid to be tested to the capacitance of the sensor with a substantially equal quantity of standard liquid thereon.

13. A method of testing the degree of oxidation of various liquids as set forth in claim 12 wherein the step of comparing the capacitance includes the step of connecting the sensor in one leg of an electronic bridge circuit having a null meter in the output, zeroing said meter with a standard liquid on the sensor, and determining the meter reading with the liquid to be tested on the sensor.

* * * * *